Aug. 30, 1960   D. M. McBEAN ET AL   2,950,829
CARRIER REMOVAL APPARATUS
Filed May 26, 1958   5 Sheets-Sheet 1

INVENTOR.
DOUGLAS M. McBEAN
LAURENCE C. TALLMAN
BY Leland A. McCann
George W. Reiber
ATTORNEYS Aug. 30, 1960     D. M. McBEAN ET AL     2,950,829
CARRIER REMOVAL APPARATUS Filed May 26, 1958     5 Sheets-Sheet 2

INVENTOR.
DOUGLAS M. McBEAN
LAURENCE C. TALLMAN
BY *Leland R. McCann*
*George W. Reiber*
ATTORNEYS

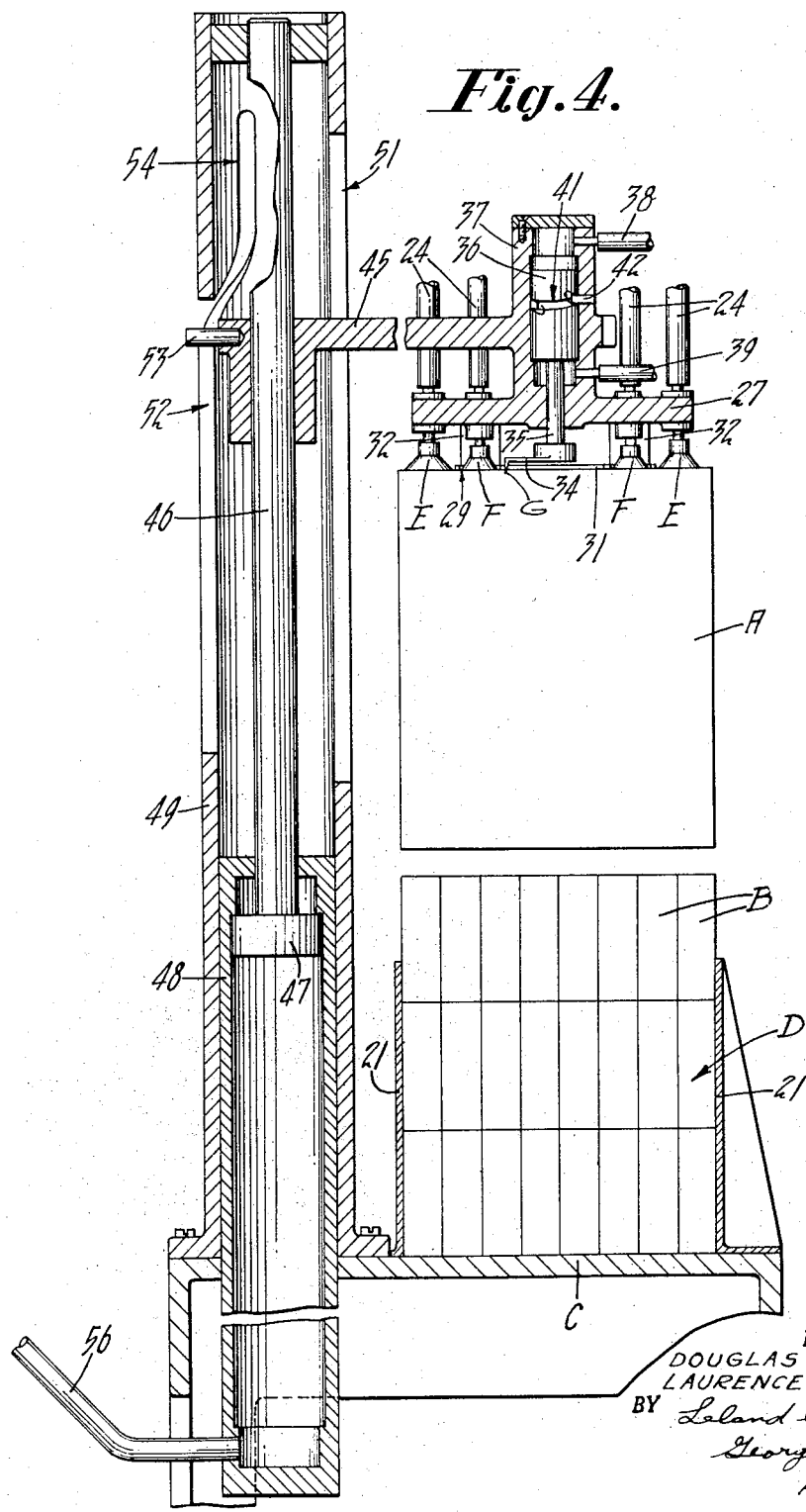

Aug. 30, 1960

D. M. McBEAN ET AL 2,950,829

CARRIER REMOVAL APPARATUS

Filed May 26, 1958

INVENTOR.
DOUGLAS M. McBEAN
LAURENCE C. TALLMAN
BY Leland R. McCann
George W. Reiber
ATTORNEYS

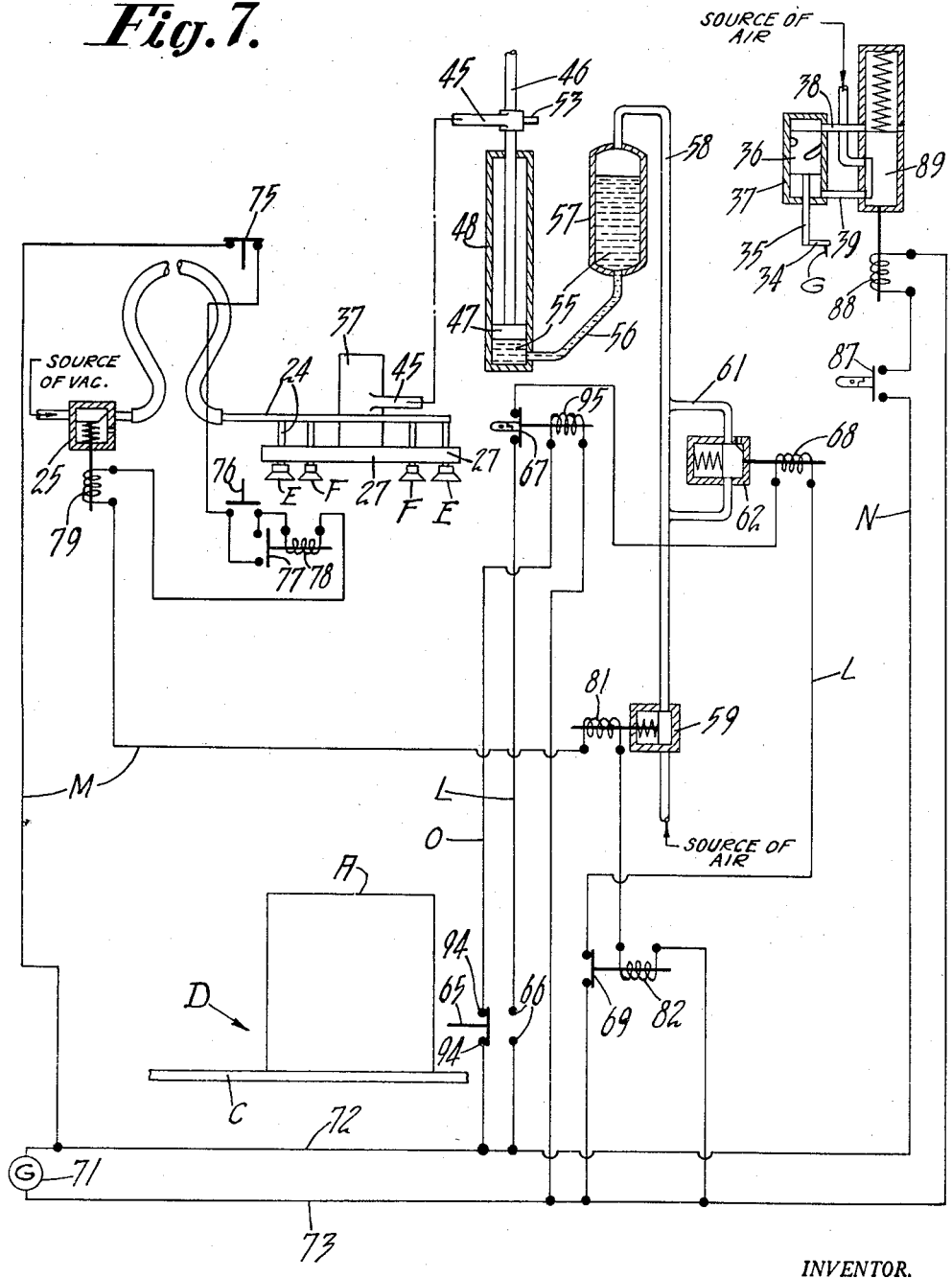

United States Patent Office 2,950,829
Patented Aug. 30, 1960

2,950,829

CARRIER REMOVAL APPARATUS

Douglas M. McBean, Rochester, and Laurence C. Tallman, Churchville, N.Y., assignors, by mesne assignments, to American Can Company, New York, N.Y., a corporation of New Jersey Filed May 26, 1958, Ser. No. 737,659

7 Claims. (Cl. 214—305)

The present invention relates to a device or apparatus for removing from a stack of packaged articles, such as containers or the like, a close fitting, paper carrier from which the bottom has been cut away and has particular reference to a device for cutting a vent opening in the carrier and for discarding the carrier after it has been removed.

The instant invention is particularly advantageous in the handling of articles such as cans or containers which at the manufacturing plant are packed in stacks of orderly arranged rows and layers of substantially rectangular formation in sealed, close fitting, fibre shipping bags or carriers to facilitate keeping the containers clean while held in storage and during transportation to the packers plant where the containers are to be filled. At the packers plant the carriers are removed from the stack of containers and the containers are fed systematically into filling or other machines, for filling or other subsequent operations.

It has been found that in stripping a close fitting carrier off a stack of containers, a vacuum is created in the head space of the carrier and this causes difficulty in removing the carrier without disturbing the stacked containers. To overcome this difficulty it has been found advisable to produce a vent opening in the carrier just prior to its removal.

An object of the instant invention is to provide a device which automatically produces a vent opening in the carrier as the carrier is being stripped off so as to prevent the formation of a vacuum in the carrier head space and thereby facilitate removal of the carrier.

Another object is to provide for supporting a predetermined area of the carrier free of the containers within the carrier during the formation of the vent opening to prevent damage to the containers within the carrier.

Another object is to provide for the automatic disposal of the removed carrier.

Numerous other objects and advantages of the invention will be apparent as it is better understood from the following description, which, taken in connection with the accompanying drawings, discloses a preferred embodiment thereof.

Referring to the drawings:

Figs. 3 and 4 are sectional views taken substantially along the line 3—3 in Fig. 1, with parts broken away, the two views showing certain of the movable parts in different positions;

Fig. 7 is a schematic view showing principal parts of the apparatus and an electric wiring diagram connecting the parts.

Figure 1:
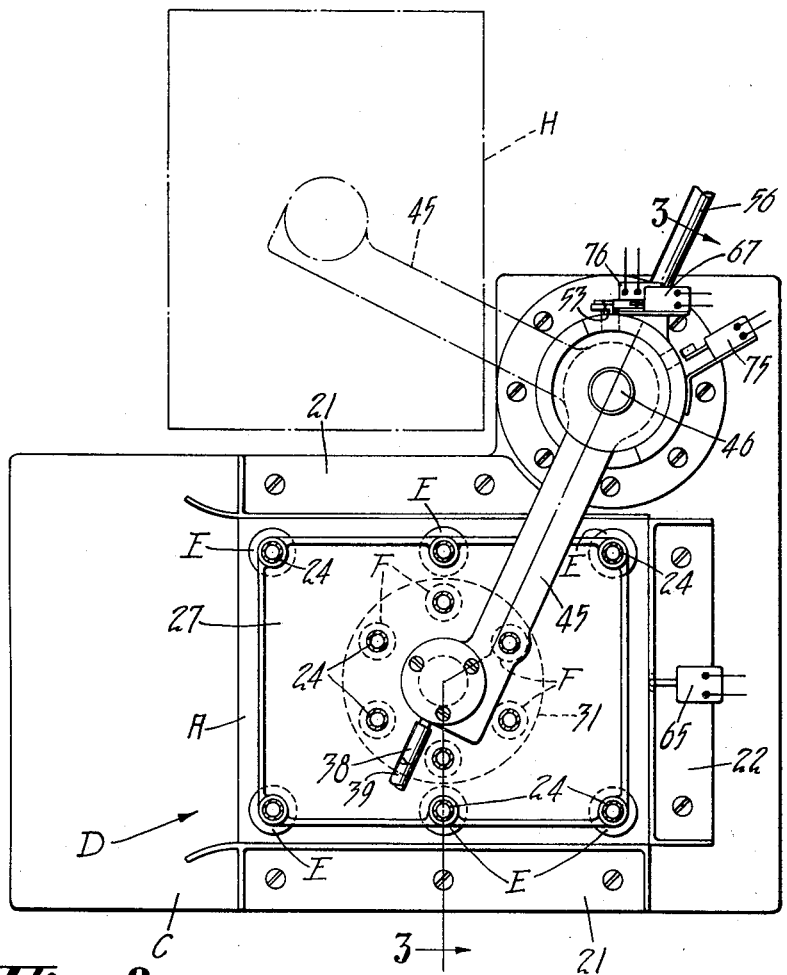
Figure 1 is a top plan view of the apparatus embodying the instant invention, the view showing in dot and dash lines a movable portion of the apparatus in a different position.

As a preferred or exemplary embodiment of the instant invention the drawings disclose a device for removing a fibre shipping carton or carrier A (Figs. 1, 2, 3 and 4) from a contained stack of articles B arranged in orderly rows and layers. The articles B shown in the drawings for example comprise rectangular fibre milk containers of the character disclosed in United States Patent 2,085,979, issued July 6, 1937, to John M. Hothersall on Container. The device is particularly adapted to automatic machinery for feeding such containers from the stack, layer by layer, so as to arrange them in a procession for a subsequent operation such as filling with a product, closing, sealing, repacking, and the like.

In such a machine, a carrier A filled with its containers B is deposited into an unloading station. As an incident to unloading the containers, an operator first cuts the bottom out of the carrier and then turns the carrier over onto its bottomless side so that the carrier may be removed vertically. In this position the carrier A and the containers B therein are delivered to a platform C of an unloading station D. The carrier removal devices are located at this station.

At this unloading station D, a plurality of gripper elements E take hold of the top of the carrier, while an auxiliary group of gripper elements F take hold and support a predetermined area near the middle of the top. While in this gripping relation the elements E, F move upwardly and thus start to strip the carrier off the containers. When the top of the carrier is clear of the containers therein, a cutter G moves down within the supported predetermined area and pierces the carrier and cuts an arcuate opening H in the top thereof to admit air into the head space of the carrier and thereby prevent the creation of a vacuum in the head space. This facilitates continued stripping of the carrier off the containers.

When the carrier A is fully stripped from the containers B, the gripper elements E, F are swung laterally, out of the unloading station D and the gripping elements release their hold on the carrier. This permits the carrier to fall clear of the containers to any suitable place of discard or disposal.

The prepared carrier A with its load of containers B may be fed into the unloading station D in any suitable manner, as for example manually as in a simple unloading machine or by conveyor as in a fully automatic machine. Side guide rails 21 and a front stop rail 22 (Figs. 1 and 3) are provided on the platform C to locate the carrier A for its removal from the containers and to locate the remaining containers B for automatic removal from the unloading station D, layer by layer. The removal of the containers forms no part of the instant invention.

The gripper elements E, F, which remove the carrier A, preferably are vacuum cups which are connected by flexible pipes 24 to any suitable source of vacuum. A normally closed, spring loaded, solenoid valve 25 is connected in the vacuum line to open and close the cups to the source of vacuum. These vacuum cups E, F, are carried in a vertically movable head member 27 (Figs. 1, 3 and 6) which is normally located above the platform C at the unloading station D so that a filled carrier A may be fed into position under the head member.

Figure 6:
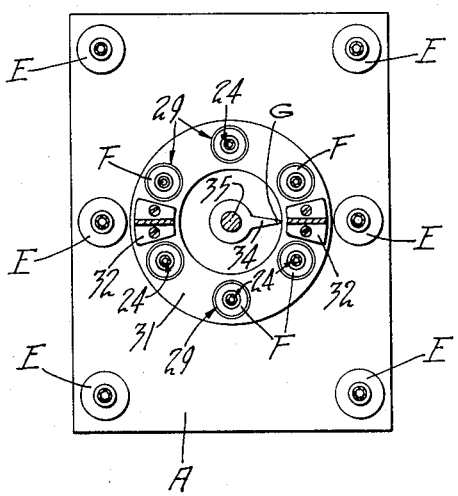
Fig. 6 is a sectional view taken substantially along a line 6—6 in Fig. 3.

There preferably are six vacuum cups E, disposed three each in two parallel lines under the head member 27 as best shown in Fig. 6, for gripping the top of the carrier A adjacent opposed marginal edge portions thereof for lifting the carrier off the containers B.

The auxiliary vacuum cups F preferably are arranged in a circle adjacent the middle of the head member 27 as best shown in Fig. 6, for gripping and holding taut a predetermined area of the top of the carrier in which the vent opening H is to be cut. The drawings show six of these auxiliary vacuum cups F equally spaced, and disposed in openings 29 in a flat carrier support ring 31 (Figs. 3 and 6) which is substantially flush with the lower faces of the vacuum cup F. This ring 31 is secured to spacer brackets 32 which depend from the lower face of the head member 27.

The head member 27 is normally located just above the path of travel of a carrier A into the unloading station D. When a carrier is in position for removal, the head member 27 is moved down until the vacuum cups E, F engage the top of the carrier, as shown in the dot and dash position of the vacuum cups in Fig. 3. The vacuum control valve 25 is then opened to connect the cups with the source of vacuum so that the cups grip the top of the carrier.

While the top of the carrier is so gripped, the head member 27 begins to move up and start the stripping of the carrier off the containers. When the carrier has been lifted just sufficient to clear its top above the containers to create a head space in the carrier, the vent opening H is cut in the area of the carrier top held taut by the auxiliary vacuum cups F. The cups F hold this area tightly against the lower face of the support ring 31 for this cutting operation.

Figure 2:
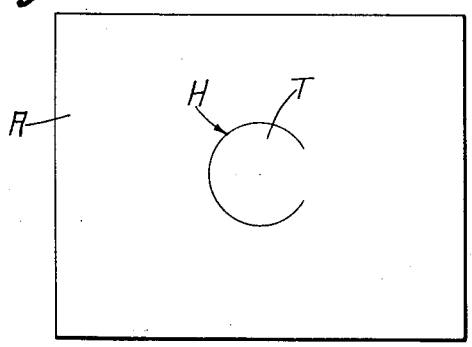
Fig. 2 is a top plan view of a carrier showing how a vent opening is formed therein.
Figure 3:
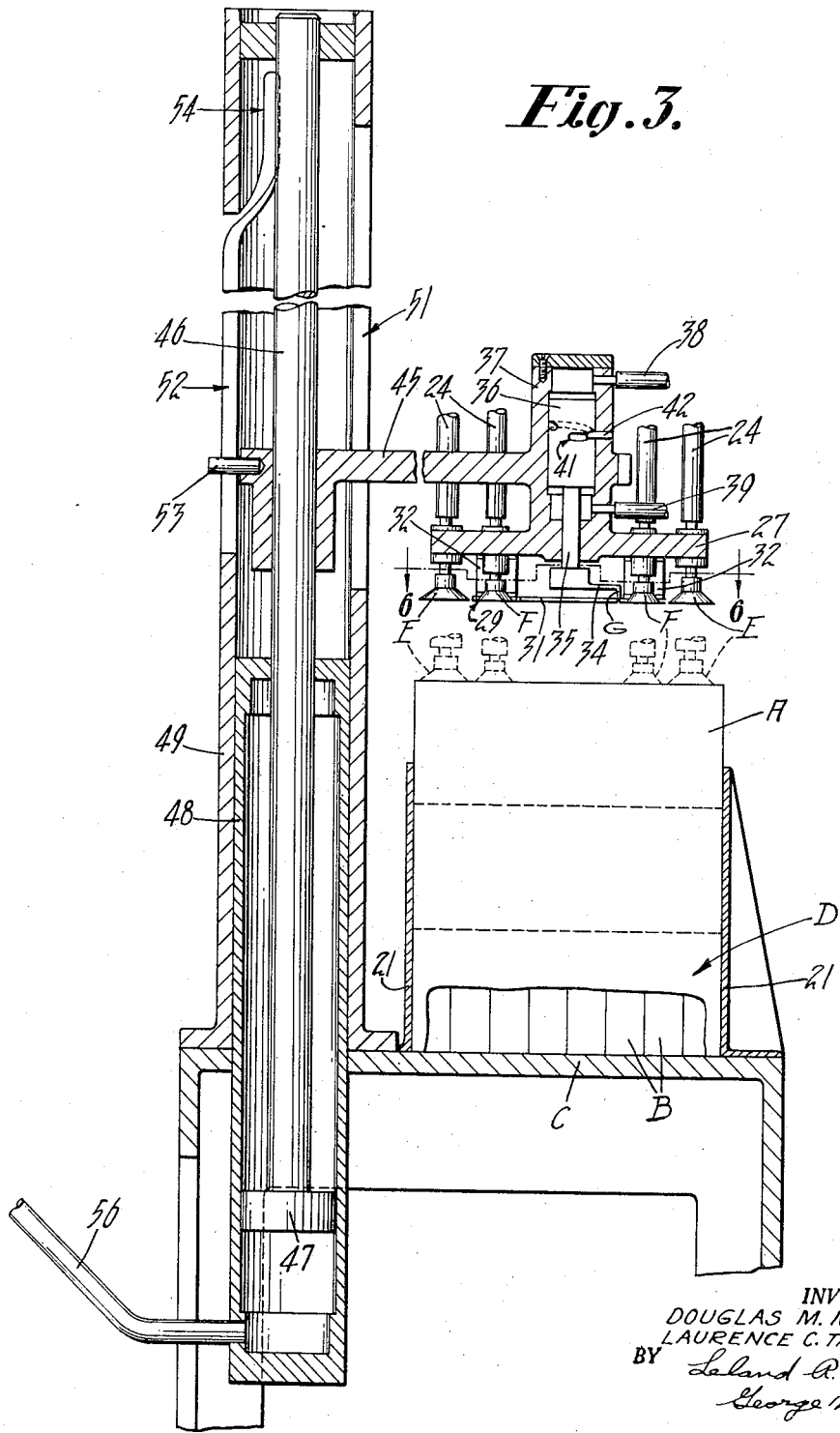

The cutting of the vent opening H is effected by the cutter G hereinbefore mentioned. This cutter G, preferably is a comparatively long, slender knife blade which is normally held in an upper retracted position above and adjacent the inner circumference of the support ring 31 as best shown in Fig. 3. When the carrier is initially lifted to the position mentioned above, the cutter G moves down and pierces the top of the carrier within the held taut area and simultaneously swings around the inner circumference of the support ring 31 in a helical motion through an arc of substantially 280 degrees, or any other desired arc, and thus cuts an arcuate slit in the carrier top, which slit defines a loose flap T as shown in Fig. 2. The cutting of this opening H in the carrier top immediately admits air into the head space of the carrier and thereby facilitates the further stripping of the carrier off the containers without disturbing them.

For the above purpose, the cutter blade G preferably is mounted in depending fashion, on the outer end of a radial arm 34 (Figs. 3 and 6) carried on the lower end of a shaft 35 journaled in the head member 27 in concentricity with the support ring 31. The upper end of the shaft 35 is secured to a long barrel piston 36 slidable vertically in an air cylinder 37 formed integrally with the head member 27. The ends of the cylinder 37 are connected to air lines or pipes 38, 39 which lead from a suitable source of supply of compressed air for actuating the piston as will be explained hereinafter in connection with the wiring diagram in Fig. 7.

The piston 36 in its outer peripheral surface is provided with a portion of a helical groove 41 which engages a stationary pin 42 fixed in the cylinder 37 as shown in Fig. 3. This groove causes the piston and hence the cutter G to rotate, as the piston is reciprocated in the cylinder, the ends of the groove serving as stops to define the degree of rotation. On a downward stroke of the piston 36, the cutter G descends and rotates to pierce and slit the carrier top, and on an upward stroke of the piston, the cutter G rises and rotates to reset the cutter in readiness for another cutting operation on a subsequent carrier.

As mentioned hereinbefore, the cutting of the vent opening H in the carrier top is effected during the first portion of the carrier stripping operation and while the head member 27 is moving upwardly through a carrier removing stroke. The head member 27 continues to move up until the carrier is fully stripped away from its load of containers as best shown in Fig. 4, and then during the latter portion of the up movement the head member 27 is simultaneously swung laterally to position the empty carrier to one side of and clear of the containers as shown in dot and dash lines in Fig. 1. At the peak of this up stroke, the vacuum cups release the carrier and the latter falls to any suitable place of discard. The head member 27 is then swung back into place over the station D and lowered to its starting position above the stack of containers B in readiness for a subsequent carrier, while the containers are unloaded, layer by layer as mentioned hereinbefore.

Figure 5:
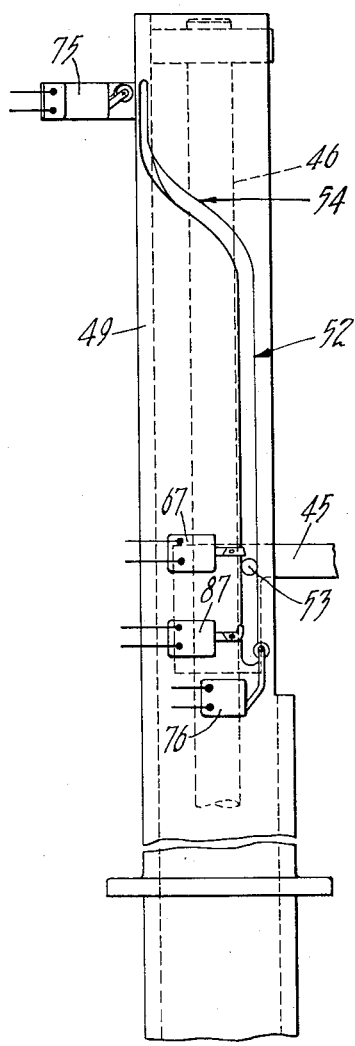
Fig. 5 is a fragmentary elevational view of the apparatus shown in Fig. 1.

The vertical and lateral movement of the head member 27 preferably is effected by hydraulic devices. For this purpose, the head member 27 is carried on the outer end of a radial arm 45 (Figs. 1 and 3) which is secured to a long upright piston rod 46. The lower end of the rod 46 is connected to a piston 47 which operates in a cylinder 48 housed within a column 49 secured to the platform C adjacent the unloading station D. The upper end of the column 49 is provided with a clearance slot 51 for the arm 45 and an oppositely disposed guide slot 52 for guiding pin 53 attached to the arm 45. The major portion of the guide slot 52 is straight and vertical as shown in Fig. 5. Its upper end is curved laterally as at 54. It is this guide slot, while guiding the pin 53 as the head member 27 moves up, that holds the head member to a straight line upward path of travel while stripping off the carrier and then swings the head member laterally to discard the carrier.

Movement of the piston 47 in its cylinder 48 preferably is effected by a fluid pressure medium 55 such as oil or the like introduced into the cylinder near its bottom end by a feed pipe 56 which leads from a reservoir 57 (see Fig. 7) supported in any suitable manner on the platform C. The upper end of the reservoir 57 is connected by an air pipe or line 58 which leads to any suitable source of air under pressure. This air introduced into the head space above the oil in the cylinder creates a pressure on the oil and forces the oil into the cylinder 48 to lift the piston 47 and the head member 27 connected thereto. A spring loaded, normally closed, solenoid actuated cutoff valve 59 is included in the pipe line 58 to control entrance of air to the reservoir 57. A by-pass 61 including a normally closed, spring loaded, solenoid actuated vent valve 62 is also included in the pipe line 58 between the reservoir 58 and the cutoff valve 59, to vent the reservoir to the outside atmosphere to permit the piston 47 and the head member 27 to move down under their own weight.

The cycle of operation for the removal of a carrier A from its containers B begins and proceeds automatically through timed actuation of a plurality of electric switches mounted on the column 49 adjacent the path of travel of the pin 53 on the head arm 45 and a switch actuated by the carrier as it moves into proper position at the unloading station D. When the carrier A is pushed into place against the front stop rail 22 it engages and closes a double contact starting switch 65 (Fig. 7), against a pair of normally open contacts 66 which are part of a normally open, starting circuit L. The circuit L includes a normally closed, spring loaded, solenoid actuated breaker switch 67, a normally deenergized solenoid 68 of the vent valve 62, and a normally closed, spring loaded, solenoid actuated breaker switch 69.

When the double contact starting switch 65, through contact with the carrier A is closed against the contacts 66, the normally open starting circuit L is closed, and electric current from any suitable source of such current, as for example a generator 71 flows from its lead lines 72, 73 through the circuit. This energizes the normally deenergized vent valve solenoid 68 and thus opens the valve i.e. pushes it toward the left as viewed in Fig. 7, to permit the air in the reservoir 57 to escape. This relieves the pressure on the oil in the reservoir and thus permits the piston 47 and the head member 27 to move down from its normal position, to a position where the vacuum cups E, F engage against the top of the carrier A as explained hereinabove.

When once the starting switch 65 is closed against the contacts 66, it remains in this position as long as anything holds it closed, i.e. during the removal of the carrier and during the unloading of the containers until the last layer of containers has been removed from the platform C.

When the vacuum cups E, F engage the top of the carrier A, at the bottom position of the head member 27, the head member closes a normally open lifting circuit M which establishes vacuumization of the vacuum cups E, F, and starts the head member 27 moving upwardly to strip the carrier A off the containers B. This lifting circuit M includes a normally closed, spring loaded stop switch 75, a normally open, spring loaded start switch 76 controlling a normally open, spring loaded, solenoid actuated holding switch 77 having a normally deenergized solenoid 78, a normally deenergized solenoid 79 connected to the normally closed vacuum valve 25, a normally deenergized solenoid 81 connected to the normally closed air cutoff valve 59, and a normally deenergized solenoid 82 connected to the normally closed breaker switch 69 in the now energized starting circuit L.

The head member 27 in its lowermost position closes the start switch 76 by contact with the pin 53 on the arm 45 projecting from the head member. The closing of this start switch 76 energizes the entire circuit M. This energizing of the circuit causes the holding switch 77 to close and stay closed to hold the circuit M energized after the head member 27 begins moving up and away from the start switch 76, which action permits the start switch to open. The closing of the circuit M energizes the solenoid 79 to open the vacuum valve 25 and thereby vacuumize the cups E, F to effect gripping of the carrier and to hold taut the area to be cut for venting. It also energizes the solenoid 81 to open the air cutoff valve 59 and thereby effect the entrance of air into the reservoir 57 to lift the piston 47 and the head member 27 connected thereto, through their up stroke. It also energizes the solenoid 82 and this opens the breaker switch 69 in circuit L, temporarily starting circuit L and deenergizing its solenoid 68 to close the vent valve 62. These conditions prevail throughout the entire up stroke of the head member 27.

As the carrier A starts to rise with the head member 27 and develops a slight head space in the carrier, the pin 53 on the arm 45 of the head member 27 engages and closes a normally open, spring loaded, uni-directional switch 87 in a normally open cutter actuating circuit N to effect cutting of the vent opening H in the top of the carrier to prevent vacuumization of the carrier head space. The circuit N includes a normally deenergized solenoid 88 of a spring loaded, slide valve 89 which controls entrance of air under pressure by way of the pipes 38, 39 to the cutter actuating cylinder 37 and its barrel piston 36.

The closing of the circuit N energizes the solenoid 88 and this shifts the slide valve 89 to introduce air into the top of the cylinder 37 and thus force the piston 36 downwardly and helically to effect cutting of the vent opening H as hereinbefore explained. Upon completion of the vent cutting operation, the pin 53 rides off the switch 87 and permits the latter to open. This breaks circuit N, deenergizes the solenoid 88 and thus allows the slide valve 89 to return to its original normal position as shown in Fig. 7. This return of the slide valve vents the upper end of the cylinder and introduces air into the bottom end of the cylinder to helically lift the barrel piston 36 and thus return the cutter to its normal or reset position in readiness for a venting operation on a subsequent carrier.

When the head member 27 reaches the top of its stroke, with the stripped off carrier A fully clear of the containers B, and shifted laterally into its discard position as hereinbefore explained, the pin 53 on the arm 45 of the head member 27 engages and opens the normally closed stop switch 75 in the lifting circuit M. The opening of this switch 75 breaks the entire circuit M and releases the holding switch 77 through deenergization of the solenoid 78.

The breaking of circuit M, deenergizes the solenoid 79 and thus causes closing of the vacuum valve 25 to cutoff the source of vacuum and to vent the cups E, F to the atmosphere. This permits the carrier A to be released from the cups to any suitable place of discard. The breaking of the circluit also deenergizes the solenoid 81 and thereby causes closing of the air cutoff valve 59 to cut off the flow of air into the reservoir 57. It also deenergizes the solenoid 82 and this causes the breaker switch 69 in starting circuit L to close and thereby reestablish circuit L and reenergize the solenoid 68 to open the vent valve 62. This vents the reservoir 57 and permits the air to escape. The empty head member 27 thereupon starts its down or resetting stroke, during which it rotates back into position over the unloading station D and descends to its normal position immediately above and close to the top of the stack of containers being removed layer by layer.

When the head member 27 reaches this normal position the pin 53 on the arm 45 projecting from the head member, engages and opens the normally closed switch 67 in the starting circuit L. This switch is a uni-directional switch and is actuated only on the down stroke of the head member as the member passes by and remains in its open position after the pin 53 rides off. The opening of this switch 67 breaks the circuit N and holds it broken even though the starting switch 65 is still closed against the contacts 66. The breaking of the circuit deenergizes the solenoid 68 and this causes the vent valve 62 to close. With the vent valve 62 and the cutoff valve 59 both closed, the pressure of the remaining air in the reservoir 57 stops the downward travel of head member 27 and holds it suspended in its normal position in spaced relation to the lower terminal end of its stroke in readiness for a subsequent carrier A.

When the last of the containers B are removed from the unloading station D, the starting switch 65 opens relative to its contacts 66 and thereby opens or partially resets the starting circuit L for a cycle of operation on a subsequent loaded carrier A. The opening of the switch 65 relative to contacts 66 causes the switch to close against a pair of contacts 94 of a resetting circuit O which includes a normally deenergized solenoid 95 of the switch 67. The closing of the contacts 94 establishes this circuit O and thereby energizes the solenoid 95. This recloses the switch 67 and thereby completes the resetting of the starting circuit L for a subsequent loaded carrier A.

It is thought that the invention and many of its attendant advantages will be understood from the foregoing description, and it will be apparent that various changes may be made in the form, construction and arrangement of the parts without departing from the spirit and scope of the invention or sacrificing all of its material advantages the form hereinbefore described being merely a preferred embodiment thereof.

We claim:

1. Apparatus for removing a closely fitting bottomless paper carrier from a batch of stacked containers, comprising a support for said containers within the carrier, a head member movable vertically toward and away from the top of said carrier on said support, means on said head member for gripping the upper end of said carrier, a rotatable cutter on said head member for penetrating the top wall surface of said carrier, means for moving said head member downwardly to penetrate said carrier by said cutter and to engage said gripping means with the carrier, and means for rotating said cutter to cut an opening in said carrier top for venting the interior of the carrier prior to upward movement of said head member to elevate and strip the vented carrier from said container stack.

2. The apparatus of claim 1 wherein said gripping means includes suction means engageable with the carrier top adjacent said cutter for holding the carrier top in vertically spaced relation to the containers throughout the area operated upon by said cutter to facilitate the cutting operation while protecting the enclosed containers against damage thereby.

3. A device of the character defined in claim 1 wherein said means for stripping the carrier from the stack of containers comprise a plurality of gripper elements movable into engagement with said carrier, means for lifting said gripper elements to strip the carrier from the containers, and means for shifting said carrier engaged gripper elements laterally away from the stack of containers to release and discard said carrier.

4. A device for removing close fitting, bottomless paper carriers from a batch of stacked containers, comprising a support for said stack of containers, a head member located above said support, gripper elements on said head member for gripping said carrier, a cutter mounted on said head member and operative in conjunction with the actuation of said gripper elements for piercing the top of said carrier and for cutting an arcuate incision therein to vent the head space in said carrier, and fluid pressure means for vertically moving said head member toward and away from said support to effect said carrier gripping and cutting operations and to strip said vented carrier from said stack of containers on said support.

5. A device of the character defined in claim 4 having cam actuated means operative in conjunction with said fluid pressure means for swinging said head member laterally relative to said support, and means for simultaneously releasing the stripped carrier from said gripper elements to discard the empty carrier at one side of said support and the containers thereon.

6. A device for removing a closely fitting bottomless carrier from a batch of supported stacked containers, comprising a vertically movable head member having a rotatable cutter thereon movable downwardly into contact with the top surface of said carrier to penetrate and cut an opening therein, means carried by said head member for rotating said cutter through an arc of less than 360° in the plane of the top of said carrier to cut an arcuate opening therein which is substantially closed by a resulting flap remaining attached to said carrier top surface for venting the carrier head space, and suction means carried by said head member for engaging and gripping the carrier for the cutting operation and for vertically stripping the carrier from the stack of containers following the cutting operation.

7. A device of the character defined in claim 6 having means carried in part by said head member for rotatively resetting said cutter for a subsequent carrier cutting operation.

References Cited in the file of this patent

UNITED STATES PATENTS

| | | |
|---|---|---|
| 2,196,081 | Reynoldson | Apr. 2, 1940 |
| 2,466,693 | Fischer | Apr. 12, 1949 |
| 2,712,176 | Miller et al. | July 5, 1955 |
| 2,730,254 | Sabaroff et al. | Jan. 10, 1956 |